US011292126B2

(12) United States Patent
Christensen et al.

(10) Patent No.: US 11,292,126 B2
(45) Date of Patent: Apr. 5, 2022

(54) ROBOTS WITH ROBUST BIPEDAL LOCOMOTION SUPPORTED WITH NON-CONVENTIONAL PHYSICS

(71) Applicant: DISNEY ENTERPRISES, INC., Burbank, CA (US)

(72) Inventors: David Loyal Christensen, Glendale, CA (US); Günter D. Niemeyer, Pasadena, CA (US); Morgan T. Pope, Burbank, CA (US); Matthew A. Estrada, Brea, CA (US); Richard-Alexandre Peloquin, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 333 days.

(21) Appl. No.: 16/655,341

(22) Filed: Oct. 17, 2019

(65) Prior Publication Data
US 2021/0114203 A1    Apr. 22, 2021

(51) Int. Cl.
*B25J 19/02*    (2006.01)
*B25J 9/16*    (2006.01)
(Continued)

(52) U.S. Cl.
CPC ........... *B25J 9/1602* (2013.01); *B25J 9/0006* (2013.01); *B25J 11/003* (2013.01); *B25J 19/0008* (2013.01); *B25J 19/02* (2013.01)

(58) Field of Classification Search
CPC ........ B25J 9/0006; B25J 19/02; B25J 11/003; B25J 19/0008; B25J 9/1602; B62D 57/032
See application file for complete search history.

(56) References Cited

U.S. PATENT DOCUMENTS 6,901,313 B2 *   5/2005   Mori ...................... G06N 20/00
                                                   700/245
6,922,609 B2 *   7/2005   Takenaka ............... B62D 57/02
                                                   318/568.1
(Continued)

OTHER PUBLICATIONS

Wyss et al., A Multidimensional Compliant Decoupled Actuator (MUCDA) for Pelvic Support During Gait, 2018, IEEE, p. 164-174 (Year: 2018).*

(Continued)

*Primary Examiner* — McDieunel Marc
(74) *Attorney, Agent, or Firm* — Snell & Wilmer L.L.P.; Kent A. Lembke

(57) ABSTRACT

A robot system with a robot configured for locomotion about a space using ground reaction force (GRF) to provide a first level of balancing. The robot system includes force generators located on or in the robot's body or offboard in the space that act to generate balancing forces to provide a second level of balancing for the robot using non-conventional physics. Clamping of a robot's feet to a support surface is provided whenever the feet are in contact with the support surface using electromagnets in the feet and a layer of ferrous material on the support surface or using mechanical coupling techniques to temporarily anchor the foot to the support surface. A balance controller processes output of balance sensors and responds by generating control signals to operate force generators onboard the robot such as electric fans or inertial reaction wheels.

18 Claims, 11 Drawing Sheets

(51) Int. Cl.
*B25J 9/00* (2006.01)
*B25J 19/00* (2006.01)
*B25J 11/00* (2006.01)

(56) References Cited

U.S. PATENT DOCUMENTS

| | | | | |
|---|---|---|---|---|
| 7,120,518 | B2* | 10/2006 | Takenaka | B62D 57/032 |
| | | | | 700/245 |
| 7,127,326 | B2* | 10/2006 | Lewis | B25J 13/081 |
| | | | | 700/258 |
| 7,308,336 | B2* | 12/2007 | Takenaka | B62D 57/032 |
| | | | | 700/245 |
| 7,319,918 | B2* | 1/2008 | Takenaka | B62D 57/032 |
| | | | | 700/245 |
| 7,319,919 | B2* | 1/2008 | Takenaka | B25J 13/085 |
| | | | | 700/245 |
| 7,379,789 | B2* | 5/2008 | Takenaka | B62D 57/032 |
| | | | | 700/245 |
| 8,463,433 | B2* | 6/2013 | Nagasaka | B25J 13/084 |
| | | | | 700/245 |
| 9,623,568 | B1* | 4/2017 | da Silva | B25J 9/0003 |
| 9,663,165 | B1* | 5/2017 | Blankespoor | B25J 9/162 |
| 10,226,870 | B1* | 3/2019 | Silva | B62D 57/032 |
| 2009/0105878 | A1* | 4/2009 | Nagasaka | B25J 13/084 |
| | | | | 700/245 |

OTHER PUBLICATIONS

Zheng et al., Admittance Control Based Humanoid Robot Standing Balance Control, 2019, IEEE, p. 167-173 (Year: 2019).*

KuzneAnwar et al., Patient cooperative adaptive controller for lower limb Robotic Rehabilitation Device, 2014, IEEE, p. 1469-1474 (Year: 2014).*

Srathy et al., Implementation of Efficient Self Balancing Robot, 2018, IEEE, p. 65-70 (Year: 2018).*

* cited by examiner

ROBOTS WITH ROBUST BIPEDAL LOCOMOTION SUPPORTED WITH NON-CONVENTIONAL PHYSICS

BACKGROUND

1. Field of the Description

The present description relates, in general, to locomotion of bipedal robots (or, more generally, "robotic devices" or "robot systems") and control methods for bipedal robots to provide balance during locomotion. More particularly, the description relates to robots and robot systems that are configured to rely upon non-conventional physics to achieve robust locomotion (e.g., locomotion with balance retention) rather than using ground reaction forces as common in conventional bipedal robots.

2. Relevant Background

The use of bipedal robots configured for locomotion is rapidly expanding to numerous diverse applications and environments. In many cases, bipedal robots have been designed to navigate in all terrains such as over surface that varies from planar to sloped and from smooth to irregular (e.g., rocky or one with obstacles). For example, bipedal robots are presently being designed to take the place of humans to perform work or activities in spaces that would be hazardous for humans, e.g., emergency responders, soldiers, and the like. As a result, these bipedal robots are being designed to have robust locomotion regardless of the terrain through control of ground reaction forces (e.g., conventional physics).

Bipedal locomotion, which may include walking and running, is one of the hardest challenges facing engineers in the robotics industry. While the issue of bipedal locomotion is of great interest to a host of academic researchers and some businesses, their target use cases are so different from those faced by robot designers for more controlled or controllable environments, such as entertainment venues including theme and amusement parks, that the two sets of designers are facing two different problems. Traditional robotics is attempting to make robots capable of traversing the entire world or any terrain and its obstacles while robot designers for entertainment venues and environments are often trying to create a robot system that can traverse a known and/or designed environment perfectly (e.g., with movements that replicate those of a well-known character, with movements that are robustly safe, and the like).

Additionally, traditional robots are designed to be operated in largely human-free spaces, but, in contrast, there are numerous applications, such as robots for entertainment venues such as theme parks, where the robot is designed for human interaction that may be from a distance (e.g., with the robot up on a stage) or up-close (e.g., with the robot walking around a space filled with people). While many robotic designs target human-looking configurations as a secondary goal, the entertainment industry often prioritizes visual appearance of the bipedal robot during its locomotion through a space. Further, even in the motion of the robot, the designer of robots for entertainment applications has different goals than the typical robotics designer as they are targeting lifelike and expressive locomotion.

Due to these many differences in design goals, it can be argued that robotics engineers working in the entertainment industry face even more difficult challenges than those in the general robotics industry. Also, the differing design goals results in much of the research into locomotion provided for conventional robots being inapplicable. Hence, there remains a need for new robot system designs that provide robust locomotion of bipedal robots used in the entertainment industry, with the understanding these new designs may then be used for more diverse robot applications such as service robots that may interact with humans (or human clients, in some cases).

SUMMARY

The inventors recognized that conventional research into bipedal robot locomotion may not be directly applicable to robots used on known terrain or in settings where the environment can be designed for use by a bipedal robot. Further, the inventors understood that because of this asymmetrical disadvantage they could and/or should use their asymmetrical advantage in creating a new robot system design to achieve improved bipedal robot locomotion by exploiting the fact that the intended use spaces (e.g., a portion of a theme or amusement park or other entertainment venue) can be used as a functioning part of the robot (or robot system). This concept that features or elements of a use space or working environment can assist in locomotion allowed the inventors to create new robots or robot systems with enhanced bipedal locomotion with "cheats" that other researchers in the robotics industry have not yet considered worthy of research efforts. In brief, this description focuses on ways to exploit non-conventional physics to provide robust bipedal locomotion for a robot rather than the more common solution of relying on control using ground reaction forces, and the new bipedal motion concepts were, in part, inspired by the idea that super human characters being replicated by theme park-based robots need super human physics.

Particularly, some robotic figures presently in use in theme parks are permanently anchored by their feet to the underlying support surface or ground so that they have the superhuman capability of being able to lean way over to an angle that would cause a human to fall down. The demand now, though, is for mobile robots that are not anchored in one place but still can provide this superhuman leaning capability as well as robust balancing during bipedal locomotion about a space. To provide selective anchoring at a robot's feet, a robot system is provided that includes a floor or support surface that includes a thin layer of ferrous material (e.g., steel plates, sheets, or tiles or the like) on its upper or exposed portions in the travel space for a bipedal robot. The bipedal robot includes very strong electromagnets in its feet (e.g., one, two, or more in each foot) to allow the robot to dynamically clamp and unclamp from the floor/support surface as it moves with bipedal locomotion about the travel space. Steel and other ferrous materials are relatively inexpensive for use in covering a large area, and, since it is known beforehand in an entertainment and other settings where the bipedal robot will be operating, it is feasible to prepare the floor or ground for these robots accordingly with a layer(s) of ferrous material where they will be walking and standing during their operations.

The robot includes a balance controller that uses a feedback system to allow the robot to run freely unimpeded, while still being clamped to the floor or support surface while each foot (or both feet concurrently) is in contact with the floor or support surface. This allows for greater angle control for the robot's body/torso (and legs in some cases) from a potentially small foot (e.g., entertainment theming may call for a smaller foot size in some cases). The greater control over balance is accomplished in part by providing a force sensor in or near each foot of the robot so that, similar to friction, as soon as the robot has removed the downward force on the foot a current driver servos the current in the electromagnet in that foot to be zero based on feedback from the force sensor (e.g., a load sensor in the ankle or foot of the robot's body) with further feedback from a Hall effect sensor(s) or the like embedded in the iron core or at the interface with the floor/support surface indicating the magnitude of the present magnetic field/coupling force. Similarly, the force sensor's output detecting a force being applied by a foot on the floor/support surface is processed by the balance controller to cause the appropriate electromagnet(s) to operate to provide a clamping or anchoring force (as may be measured by one or more Hall effect sensors or the like embedded in the foot of the robot) to lock that foot to the floor/support surface. This approach to robust locomotion of a bipedal robot makes the robot able to move smoothly, not tripping on its own feet (even when moving relatively quickly), while giving it good balance and also superhuman capabilities that are desired in some settings such as being able to lean to an large angle forward, backward, or sideways (e.g., angles of 30 to 45 degrees or more from vertical).

For some specific applications or shows that include robots, an unconventional physics force generator may be provided onboard or offboard the bipedal robot to apply forces to the robot (e.g., to its body/torso) to retain its balance. To this end, the robot may include a balance sensor detecting a current pose of the robot such as an offset angle of an axis extending through the center of mass (COM) of the robot's body/torso relative to vertical and, in some case, a rate and/or direction of movement of the robot from vertical (e.g., movement of the axis extending from the COM away from vertical). The output of the balance sensor is processed by a balance controller to determine when a force should be applied to the robot to retain balance and the direction and magnitude of this corrective or righting force.

Offboard force generators may be provided in the travel space such as in a part of the scenery near the robot. For example, the force generator may be configured to blow a fluid such as air or water from jets at the robotic figure to right it or stabilize it, thereby extending the capabilities of the robot. The robot system may further include force generators to provide righting capabilities from intelligent objects as part of the travel space's set. For example, a light pole could be moved to push the robot in a particular direction once the robot gets close to it and/or walks around it. Since magnetic torque drops over distance much slower than force, the robot may be fabricated to include an elongated magnet (e.g., a 4-foot tall neodymium magnet or the like) that acts to align itself with another magnet (e.g., another 4-foot tall neodymium magnet or the like) positioned above or below the robot in the travel or show space.

Additionally or alternatively, onboard force generators may be provided on the robot to selectively provide unconventional physics forces to retain balance of the robot during its bipedal locomotion through a space. For example, a standing, walking, or running robot may be stabilized using non-contact forces such as fans, aerodynamic flaps, rockets, compressed air release devices, inertial shifting mechanisms, and/or gyroscopic stabilization components that are provided onboard the robot such on or in the torso/body of the robot. These can be operated to act either as the primary form of stabilization or as a last resort before failure when normal contact-based control fails or anywhere in between (e.g., to augment a marginally stable walking gait achieved by a bipedal robot). The new robot systems or components can be controlled or used to materially affect the pose or orientation of the robot both while the robot is in contact with the floor or support surface and while it is in the flight or above-ground phase of a running or hopping gait.

These solutions can be power intensive such that they likely are undesirable for many conventional robot designs. However, the inventors have created their new robot system designs to take advantage of the fact that the robot may only be "on camera" or visible to observers in a show or travel space for a limited period of time. At the extreme, the ground interaction forces from a walking or running gait of the new bipedal robot become simply disturbances to the primary control scheme instead of active control elements as is the case for conventional bipedal robots. This is desirable as it reduces the complexity and bandwidth of the gait actuators required for walking and walking with the new robots as well as achieving superhuman locomotion to entertain observers of these robots.

More particularly, a robot system is provided to achieve enhanced balancing of robots as they stand and move about a space. The system includes a robot with a body positioned in the space. The system further includes a sensor assembly sensing an angular orientation of the body of the robot or movement of the body relative to vertical. A balance controller is included that generates control signals when the angular orientation or the movement of the body exceeds a predefined threshold value for retention of balance for the robot in the space. Further, the system includes a balance force generation assembly operating in response to the control signals to apply a balancing force upon the body of the robot to modify the angular orientation or resist the movement of the body relative to vertical.

In some embodiments of the system, the sensor assembly and the balance controller are positioned within the body of the robot. The robot and its body may be configured for bipedal locomotion through the space using ground reaction force (GRF)-based control, and the balancing force is additive to forces generated by the GRF-based control.

In the same or other embodiments of the system, the balance force generation assembly may include at least one electric fan positioned on the body of the robot, and this fan is operable in response to the control signals from the balance controller to operate to output a stream of air from the body of the robot to apply the balancing force upon the body of the robot. In some cases, the balance force generation assembly includes a large capacity fan in the space, and the robot is positioned in an output stream of air from the fan (e.g., to walk into the generated headwind). Then, the balance force generation assembly may include at least one aerodynamic flap provided on an exterior surface of the body of the robot that is positionable by an actuator in response to the control signals to apply the balancing force on the body of the robot.

In these or other embodiments of the robot system, the balance force generation assembly includes an inertial reaction wheel positioned within the body of the robot operating in response to the control signals to generate the balancing force. In such embodiments or other implementations, the balance force generation assembly includes a mechanism launching projectiles at the body of the robot in response to the control signals, a mechanism projecting water or air streams onto exterior surfaces of the body of the robot in response to the control signals, and/or a mechanism rotating or moving physical structural elements or objects in the space to strike an exterior surface of the body of the robot in response to the control signals.

In some preferred embodiments, a robot system is provided that assists in GRF-based control of a robot during its movements within a space (e.g., a show space at a theme park or the like). The system includes a robot with a body positioned in the space, and a balance force generation assembly operates to apply a balancing force upon the body of the robot to resist tipping or falling of the robot. The balancing force is a force that replaces or is additive of any ground reaction forces provided for balancing the robot during locomotion of the robot in the space.

In some implementations of such a system, the body of the robot includes a left foot and a right foot, and the space includes a support surface including an upper layer formed of a ferrous material. Further, the balance force generation assembly includes at least one electromagnet in each of the left and right feet. A balance controller generates a control signal to independently operate the electromagnet in the left foot when the left foot is contacting the support surface and the electromagnet in the right foot when the right foot is contacting the support surface. In some cases, the robot system includes a sensor assembly including a load sensor proximate to each of the left and right feet sensing loads indicative of the contacting of the left and right feet on the support surface, and the balance controller processes output of the load sensors and, in response, generates the control signals for the electromagnets. Additionally, the balance controller may be configured to halt operation of the electromagnets when the loads are less than a threshold value, whereby clamping of the left and right feet is only provided when the robot is operated to step down upon the support surface.

In other implementations of this robot system, a floor is provided in the space comprising a plurality of retractable anchor elements. The robot includes a right foot and a left foot, and the right and left feet each includes a coupling mechanism for releasably engaging one of the retractable anchor elements when positioned on the floor over the one of the retractable anchor elements, whereby the right and left feet are selectively anchored to the floor. Each of the retractable anchor elements may include a ferrous pin. Then, the coupling mechanisms each may include a recessed surface for receiving the ferrous pin, a magnet for applying an attractive magnetic force upon the ferrous pin to draw the ferrous pin up from the floor into the recessed surface, and a coupling member positionable in the recessed surface to selectively couple with the ferrous pin.

In still other useful implementations of the robot system, the balance force generation assembly includes a first elongated permanent magnet oriented vertically in or on the body of the robot with a first pole at an upper end and an opposite second pole at a lower end. The balance force generation assembly may further include a second elongated permanent magnet provided in the space at an offset distance from the body of the robot. The second elongated permanent magnet can be magnetically oriented similar to the first elongated permanent magnet (e.g., both with an N-pole or an S-pole up) vertically with a first pole at an upper end and an opposite second pole at a lower end proximate to the body of the robot. In use magnetic fields of the first and second elongated permanent magnets interact to provide the balancing force to retain alignment of the first and second elongated permanent magnets.

DETAILED DESCRIPTION

Briefly, robot systems are provided that include a robot that may take the form of a bipedal robot, and the systems further include a balance controller that selectively operates an unconventional physics force generator to provide a balancing or righting force to retain balance of the bipedal robot as it moves about a travel or show space with bipedal locomotion. The inventors recognized that the robot system can be designed in unique ways relative to conventional bipedal robots because the inventors can design the travel or show space, in some cases, to provide portions of the force generator or with the knowledge that the robot may only be "on camera" or operating in the space for a limited time period allowing the force generator to be power intensive in some cases.

Instead of merely mimicking human motion for robot control, the new robot systems may be designed to augment robot locomotion with superhuman capabilities, such as extreme leaning abilities. This gives an asymmetrical advantage to the inventors in this particular robotic design space to provide robots that audiences will not see in other environments that do not have these controlled or designable space advantages. In a world where robotics are becoming commonplace, the new robot system provides tools that allow its operators to continue to surprise and delight observers of its bipedal robots and their unique locomotion capabilities.

Figure 1:
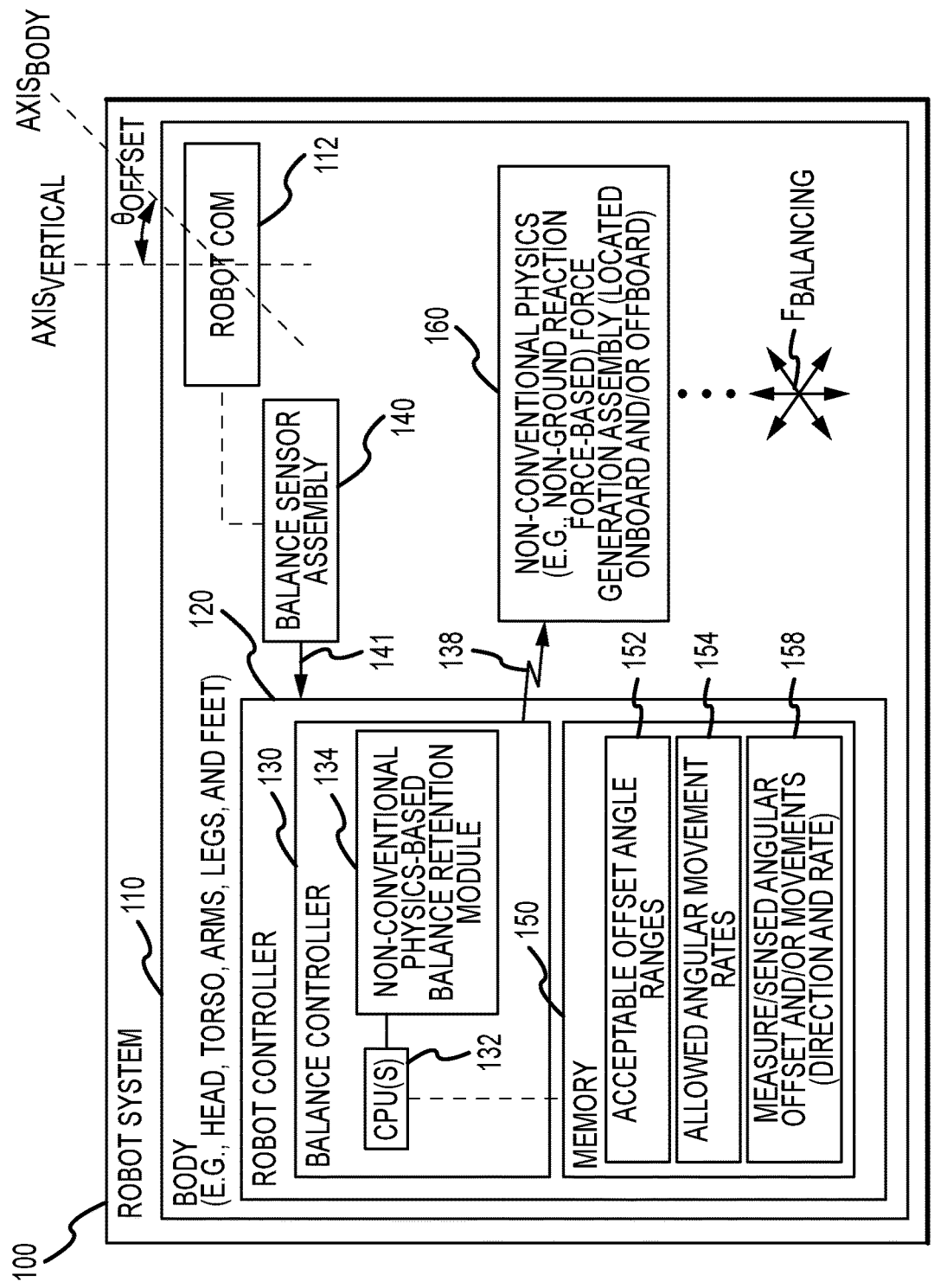
FIG. 1 is a functional block diagram of a robot system of the present description showing the combined use of a balance controller, a feedback loop with a balance sensor assembly, and non-conventional physics force generation assembly.

FIG. 1 illustrates a robot system 100 with a functional block diagram showing components that when used in combination may provide a robot (e.g., a bipedal robot or other robotic character) with robust locomotion (e.g., bipedal standing, walking, and running). The robot system 100 includes a body 110 that may take a wide variety of configurations to practice the system 100 such as a human-like configuration with a head, torso, arms, legs, and feet (e.g., two legs each ending in a "foot" that is used to provide a contact surface with the ground or other supporting surface). The body 110 has a center of mass (COM) 112 that may be generally located centrally in the torso of the body 110 or some other location depending upon its design, and a vertical axis (or "vertical"), $Axis_{Vertical}$, extends through the robot's COM 112. Also, an axis, $Axis_{Body}$, of the body 110 extends through the COM 112, and, during use and movement, this axis, $Axis_{Body}$, may become offset by some amount as measured by an angular offset, $\theta_{Offset}$, from vertical, $Axis_{Vertical}$. Measurement or sensing of this angular offset, $\theta_{Offset}$, may be used in some implementations alone or in combination with rates of angular movement from vertical, $Axis_{Vertical}$, to sense whether or not the robot body 110 is balanced while standing or in locomotion. The robot controller 120 may be configured to issue control signals to actuators (not shown but well understood from their use and configuration in conventional robotic devices and by those skilled in robotics) in the body 110 to provide a desired locomotion and/or limb movement.

The robot controller 120 further includes a balance controller 130 with a processor(s) 132 running executable code or software to provide functionality of a non-conventional physics-based balance retention module 134. Also, memory 150 on the body 110 is accessible and/or managed by the processor 132, and data used by the balance retention module 134 is stored in memory 150. This data may include ranges 152 of acceptable or allowed values for the offset angle, $\theta_{Offset}$, for retaining balance of the robot body 110. The data may include angular movement rates 154 that are acceptable or allowed to retain the balance of the robot body 110 during standing and/or locomotion.

The robot system 100 further includes a balance sensor assembly 140 that may include one or more sensors on or off the robot body 110 that function to sense balance data 141 that is communicated (in a wired or wireless manner) to the balance controller 130. The assembly 140 may include an inertial measurement unit (IMU), a gyroscope, an accelerometer, outward-looking rangefinders (laser-based or the like), and the like. For example, this sensed data 141 may include measured/sensed angular offsets and/or movements (direct and/or rate) 158 that are stored in memory 150 for processing by the balance retention module 134. Such processing may include comparing the measured angular offset, ° Offset, to determine whether correctional forces (and their direction and/or magnitude) need to be applied to move the body axis, $Axis_{Body}$, back in alignment or toward alignment with vertical, $Axis_{Vertical}$. In the same or other implementations of the balance retention module 134, it may act to process a rate and/or direction of angular movement of the body 110 from vertical, $Axis_{Vertical}$, such by sensed movement of the body axis, $Axis_{Body}$. These values may be compared with acceptable offsets 152 and/or rates/directions of angular movement 154 to determine whether corrective forces should be applied to retain balance of the body 110.

Based on this processing of feedback 141 from the sensor assembly 140, the balance retention module 134 generates control signals 138 that are transmitted (in a wired or wireless manner) to a non-conventional physics force generation assembly 160. The assembly 160 is labeled as a non-conventional physics assembly as it is adapted to rely wholly or at least partially upon forces other than ground reaction forces (GRFs) to retain the balance of the body 110. The assembly 160 may be located wholly upon or in the body 110 or it may be wholly or partially positioned in the space through which the robot body 110 travels during locomotion or is positioned when standing. In response to receipt of the control signals 138, the force generation assembly 160 operates (such as with control signals from a controller of the assembly 160 not shown in FIG. 1) one or more actuators, drivers, or other devices to apply a balancing force, $F_{Balancing}$, upon the body 110 to retain balance (e.g., to move the body axis, $Axis_{Body}$, back toward vertical, $Axis_{Vertical}$, or to resist a current angular movement). The following description first provides exemplary control loops that may be used to implement the module 134 and then provides specific examples of implementations of the non-conventional physics force generation assembly 160 to provide the balancing forces, $F_{Balancing}$.

Figure 2C:
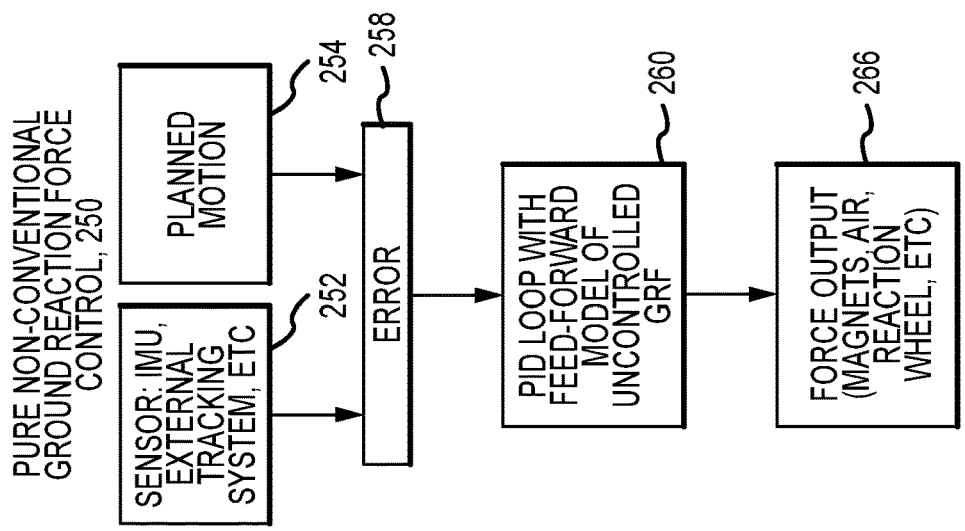
FIGS. 2A-2C illustrate simplified flow diagrams of balance control methods that may be implemented within a robot system of the present description to selectively apply corrective or balancing forces.
Figure 2B:
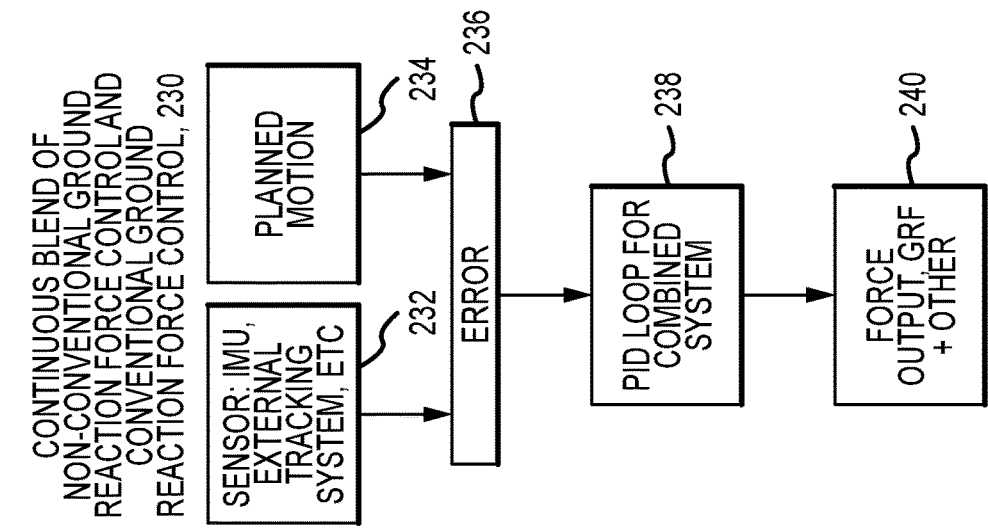
Figure 2A:
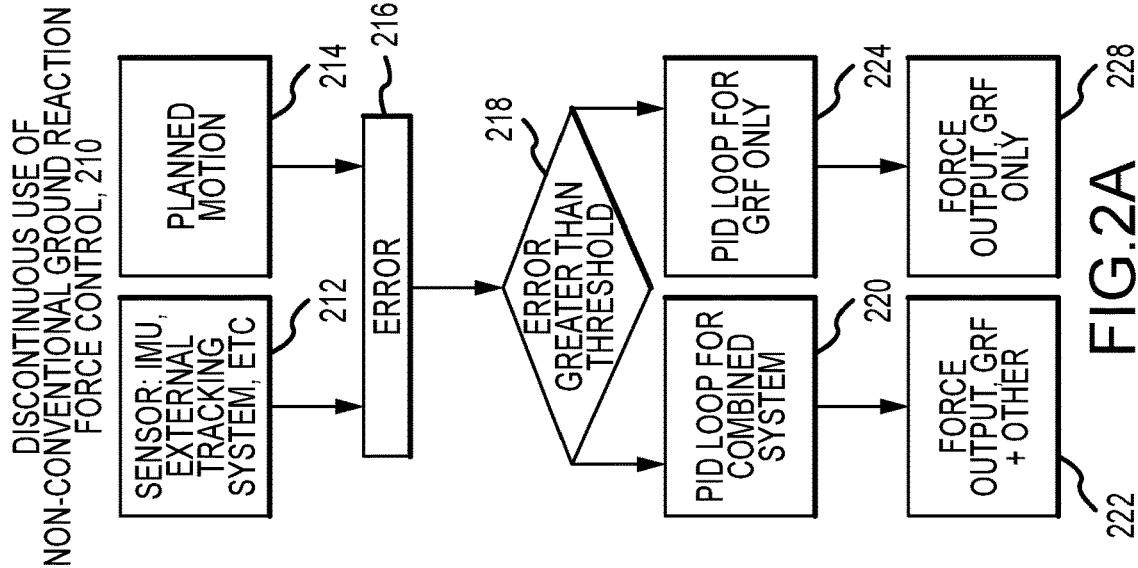

FIGS. 2A-2C illustrate simplified flow diagrams of balance control methods that may be implemented within a robot system of the present description to selectively apply corrective or balancing forces such as with balance retention module 134 of FIG. 1 to generate control signals 138 for force generation assembly 160. FIG. 2A shows data flow during a control method 210 that is configured for discontinuous use of non-conventional GRF control. As shown, the control module processes data output from a sensor(s) 212 (e.g., an IMU, an external tracking system, or the like) to compare it with a planned or intended motion (e.g., balanced motion) 214 of the robot. This processing may produce a determined error or difference 216 between the planned motion 214 and the sensed motion defined by sensor output 212, and the balance control or retention module may then compare this error 216 with a predefined range or threshold of acceptable errors at 218 (e.g., is angular offset of body from vertical too great such that balance may soon be lost?).

The balance retention module or balance controller may then select to enter a loop for a combined GRF and non-conventional physics force generation system at 220 (e.g., a proportional-integral-derivative (PID) control loop or the like). The output of this loop 220 provides control signals defining force outputs at 222 for the GRF devices of the robot along with one or more non-conventional physics force generators (as discussed in more detail below), which in concurrent or sequential application rights or balances the robot during standing or locomotion.

FIG. 2B shows data flow during a control method 230 that is configured for continuous blended use of non-conventional GRF control and conventional GRF control. As shown, the control module processes data output from a sensor(s) 232 (e.g., an IMU, an external tracking system, or the like) to compare it with a planned or intended motion (e.g., balanced motion) 234 of the robot. This processing may produce a determined error or difference 236 between the planned motion 234 and the sensed motion defined by sensor output 232. The controller or balance retention module then enters a control loop (e.g., a PID loop) at 238 for the combination of non-conventional GRF devices and conventional GRF devices, and the result includes control signals for these force generators at 240 to right or balance the robot using a combination of non-conventional and conventional GRF force control.

FIG. 2C shows data flow during a control method 250 that is configured for use of pure non-conventional GRF control to balance a robot during standing and locomotion. As shown, the control module processes data output from a sensor(s) 252 (e.g., an IMU, an external tracking system, or the like) to compare it with a planned or intended motion (e.g., balanced motion) 254 of the robot. This processing may produce a determined error or difference 258 between the planned motion 254 and the sensed motion defined by sensor output 252. The controller or balance retention module then enters a control loop (e.g., a PID loop) at 260 for the non-conventional GRF devices. In some cases, the control loop may use a feed-forward model of uncontrolled GRFs. The result of step 260 includes control signals for non-conventional GRF force generators (e.g., magnets, fans, jets, reaction wheels, and so on) at 266 to right or balance the robot using non-conventional GRF force control to provide force outputs applied to or from the robot.

Figure 3A:
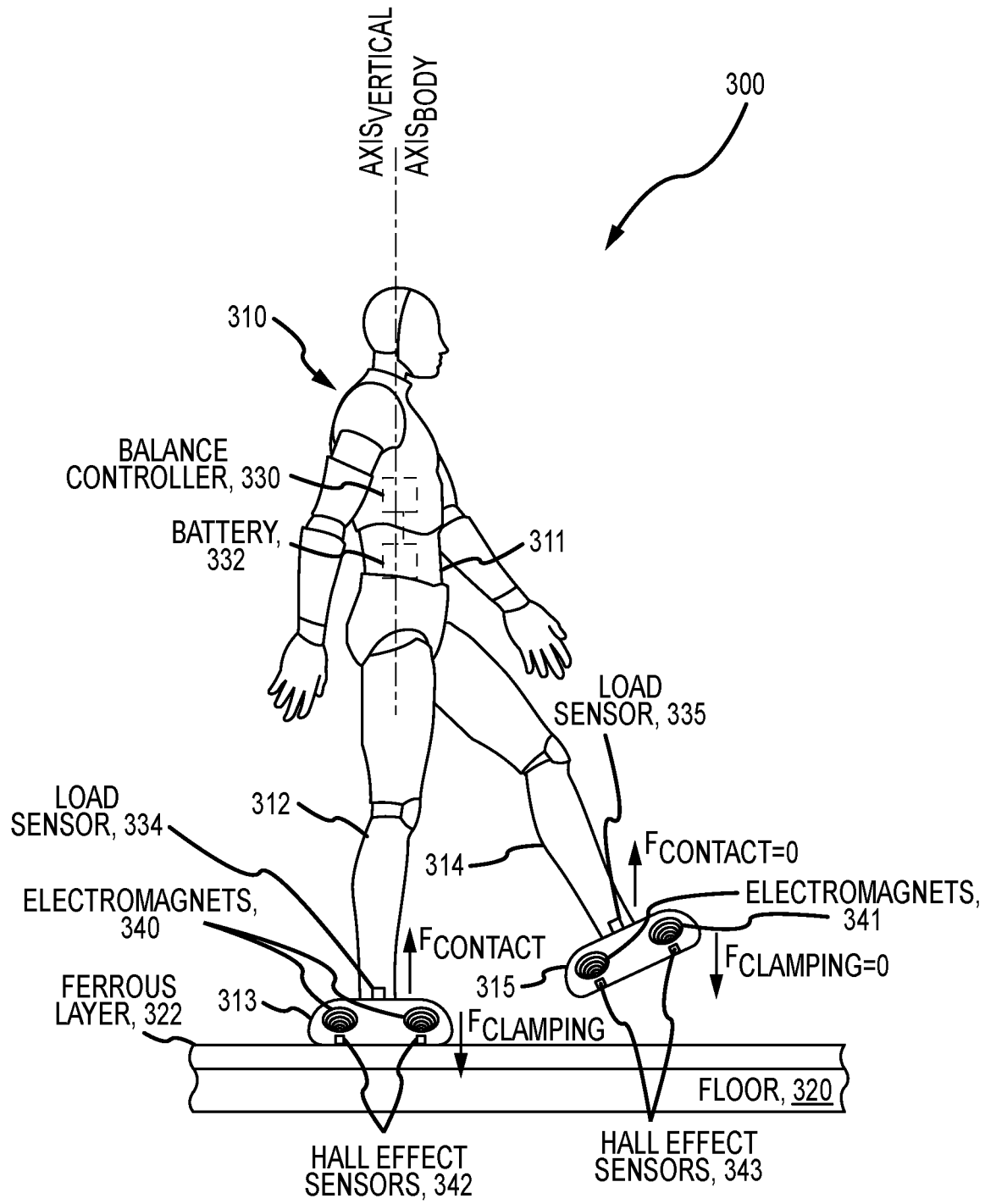
FIGS. 3A-3C illustrate a robot system of present description used to provide a robot with robust bipedal locomotion and also extreme leaning while standing.
Figure 3B:
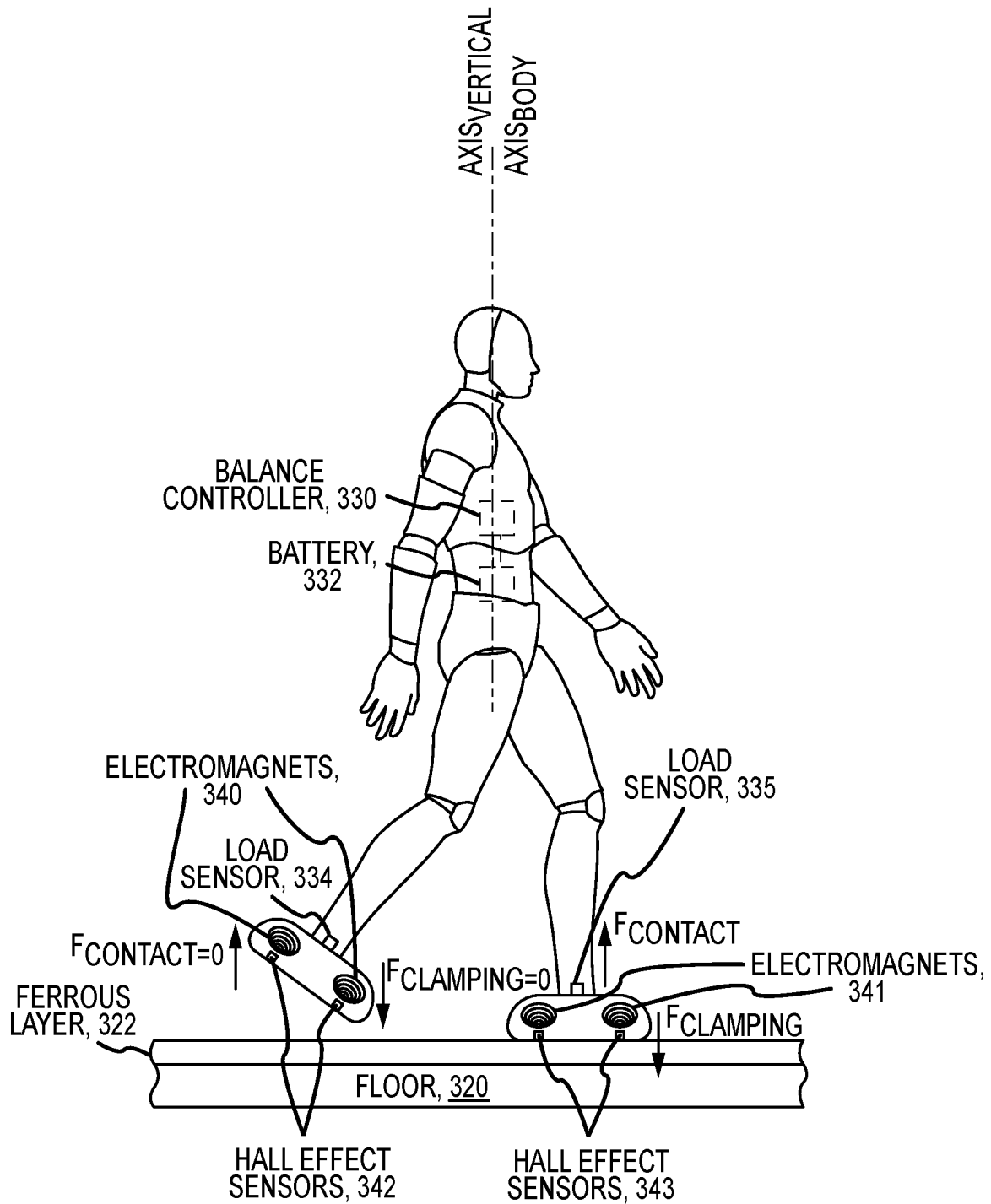
Figure 3C:
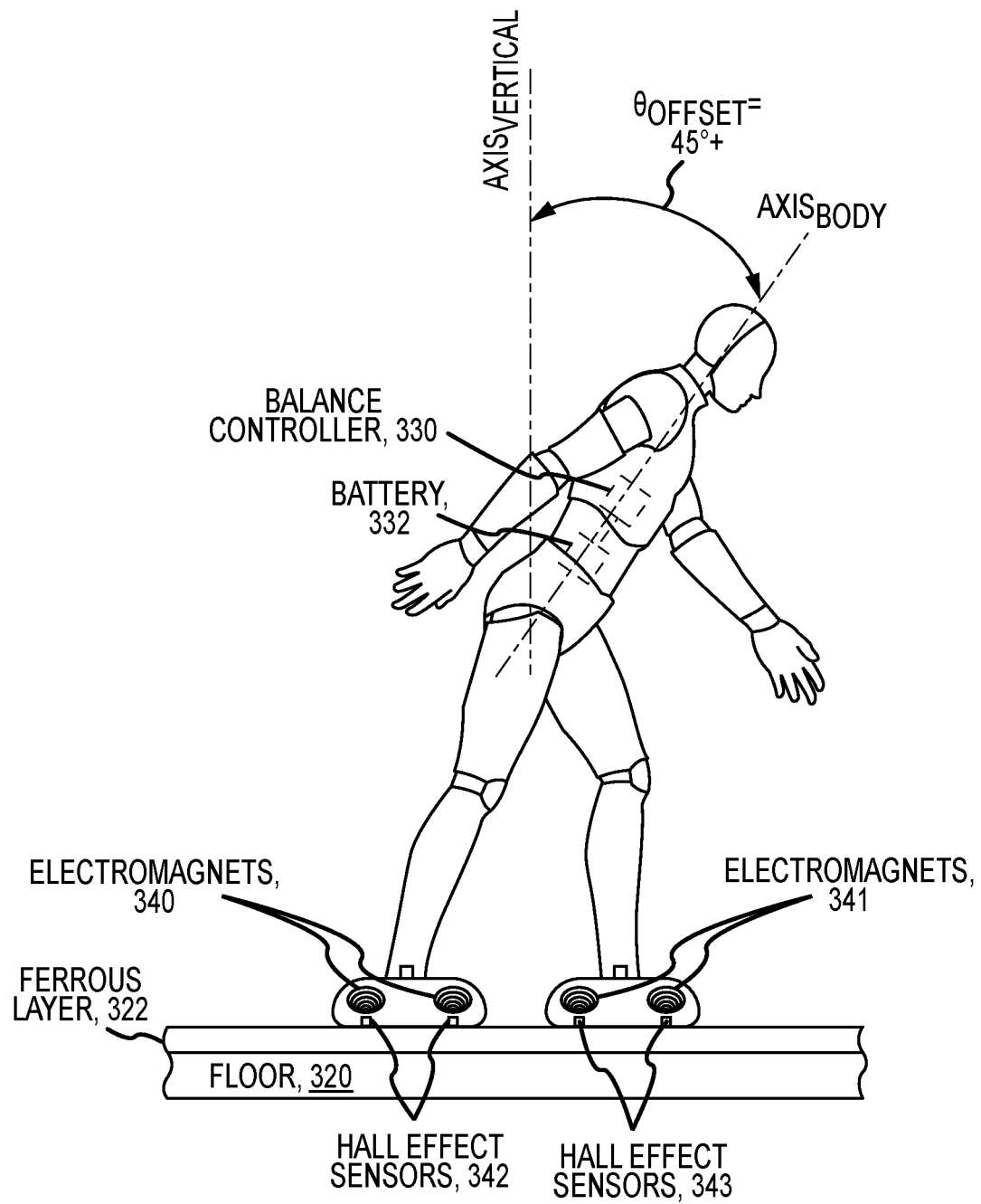

FIGS. 3A-3C illustrate a robot system 300 of the present description used to provide a robot 310 with robust bipedal locomotion (see FIGS. 3A and 3B) and also extreme leaning while standing (see FIG. 3C). In the system 300, magnets are utilized to provide magnetic fields in a discontinuous manner so as to provide clamping or retention forces between the robot 310 and the supporting surfaces only when it is determined or sensed that the robot 310 is touching or contacting the supporting surfaces or ground, which avoids noisy and overly forceful/violent interaction between the robot 310 and the support surface or ground. The robot 310 is shown to be human-like with a torso 311, right and left legs 312, 314, and right and left feet 313, 315 at the end of the legs 312 and 314. The robot 310 includes actuators, power supplies, and controls to move the legs 312, 314 (and torso 311) to provide bipedal locomotion such as walking, running, and jumping as well as to stand in one location. These components are not shown and may take any form well known in the robotics arts.

Significantly, the robot system 300 is adapted to provide robust balancing during this locomotion and standing of the robot 310 rather than merely relying upon GRF-based control. To this end, the robot system 300 includes a support surface made up of a floor or base 320 over which a layer of ferrous material 322 is applied or lain such that the robot 310 is supported upon this metallic layer 322 as it moves through a travel or show space including the floor 320. Each of the feet 313, 315 (which may be one part, two part as shown, or be configured with three or more parts) includes one, two or more electromagnets 340, 341, and the robot 310 includes a balance controller 330 and a power source 332 for the electromagnets 340, 341. During operations, the balance controller 330 generates control signals to actuate (e.g., via a driver not shown) the electromagnets 340, 341 to create a magnetic field that provides a clamping or retention force between each foot 313, 315 of the robot 310 and the ferrous material layer 322.

Further, to choose when to activate the magnets 340, 341, the robot system 300 is shown to include a load sensor (e.g., a load cell or the like) 334, 335 in each leg 312, 314 such as in an ankle joint and also to include a Hall effect sensor 342, 343 in the coil/core of the electromagnets 340, 341. The balance controller 330 is configured to process outputs of the load sensors 334, 335 along with feedback from the Hall effect sensors 342, 343 to provide magnetic clamping in a manner that is timed to assist in balancing the robot 310 as it moves over the ferrous layer 322 and underlying floor/base 320. Bipedal walking is shown in FIGS. 3A and 3B.

In FIG. 3A, the load sensor 334 of the right leg 312 senses a positive value (e.g., a force magnitude above a predefined minimum value) for the contact force, $F_{Contact}$, indicating the left foot 313 is abutting or touching the ferrous layer 332. In response, the balance controller 330 generates control signals to a driver of one or both of the electromagnets 340 to create a magnetic field that interacts with the ferrous layer 322 to apply a clamping force, $F_{Clamping}$, (or attraction force) on the foot 313 that retains it in position and/or resists its slipping on the floor 320. Feedback from the Hall effect sensors 342 may be processed by the balance controller 330 to ensure that the magnetic field is as large as desired to achieve the desired magnitude of the clamping force, $F_{Clamping}$, and the magnetic field may be achieved with an on/off approach or with a ramping up and down approach over the contact time. Also, in FIG. 3A, it can be seen that the load sensor 335 in the left leg 314 does not sense a contact force (e.g., $F_{Contact}$ is zero or below the predefined minimum contact force to initiate the magnetic-based clamping). In response, the balance controller 330 determines that no control signals are sent to the drivers/actuators of the electromagnets 341 such that no or minimal magnetic fields are generated and the clamping force is nonexistent or minimal (e.g., $F_{Clamping}$ is zero or minimal) for the left foot 315 with the left foot 315 positioned a distance above the layer 322.

In FIG. 3B, the robot 310 has taken a step. The load sensor 334 of the right leg 312 no longer senses a positive value (e.g., a force magnitude above a predefined minimum value) for the contact force, $F_{Contact}$, indicating the right foot 313 has been (or is being) raised a distance from the ferrous layer 332. In response, the balance controller 330 halts generation and transmission of control signals to a driver of one or both of the electromagnets 340 to halt the magnetic field so the clamping force, $F_{Clamping}$, (or attraction force) on the foot 313 has minimal or a zero magnitude. Feedback from the Hall effect sensors 342 may be processed by the balance controller 330 to ensure that the magnetic field is off or minimal. Also, in FIG. 3B, it can be seen that the load sensor 335 in the left leg 314 now senses a positive contact force (e.g., $F_{Contact}$ is greater than zero or above the predefined minimum contact force to initiate the magnetic-based clamping). In response, the balance controller 330 determines that control signals need to be generated and sent to the drivers/actuators of the electromagnets 341 such that magnetic fields are generated, and the clamping force, $F_{Clamping}$, is provided for retaining the left foot 315 abutting or mating with the ferrous layer 322.

In FIG. 3C, the balance controller 330 processes outputs from the load sensors 334 and 335 to determine that both feet 313, 315 are on the ground or in contact with the ferrous layer 322, and, in response, it generates control signals to activate/operate the electromagnets 340, 341 in both feet 313, 315 to provide magnetic fields that concurrently provide the clamping or balancing forces, $F_{contact}$, for both feet 313, 315. The robot 310 may then further operate to provide extreme leaning or other superhuman movements not possible if the feet 313, 315 were unclamped. The leaning is shown by the angular offset, ° offset, in the range of 0 to 45 degrees (or more) as measured between the body axis, $Axis_{Body}$, and vertical, $Axis_{Vertical}$, with higher values often being used to allow the robot 310 to strike poses or movements not typically possible by their human or character counterparts. In contrast, when walking as shown in FIGS. 3A and 3B, the body axis, $Axis_{Body}$, is typically aligned with vertical, $Axis_{Vertical}$, or within an allowable range of angular offsets such as 0 to 15 degrees to better retain balance of the torso 311 of the robot 310.

Figure 4:
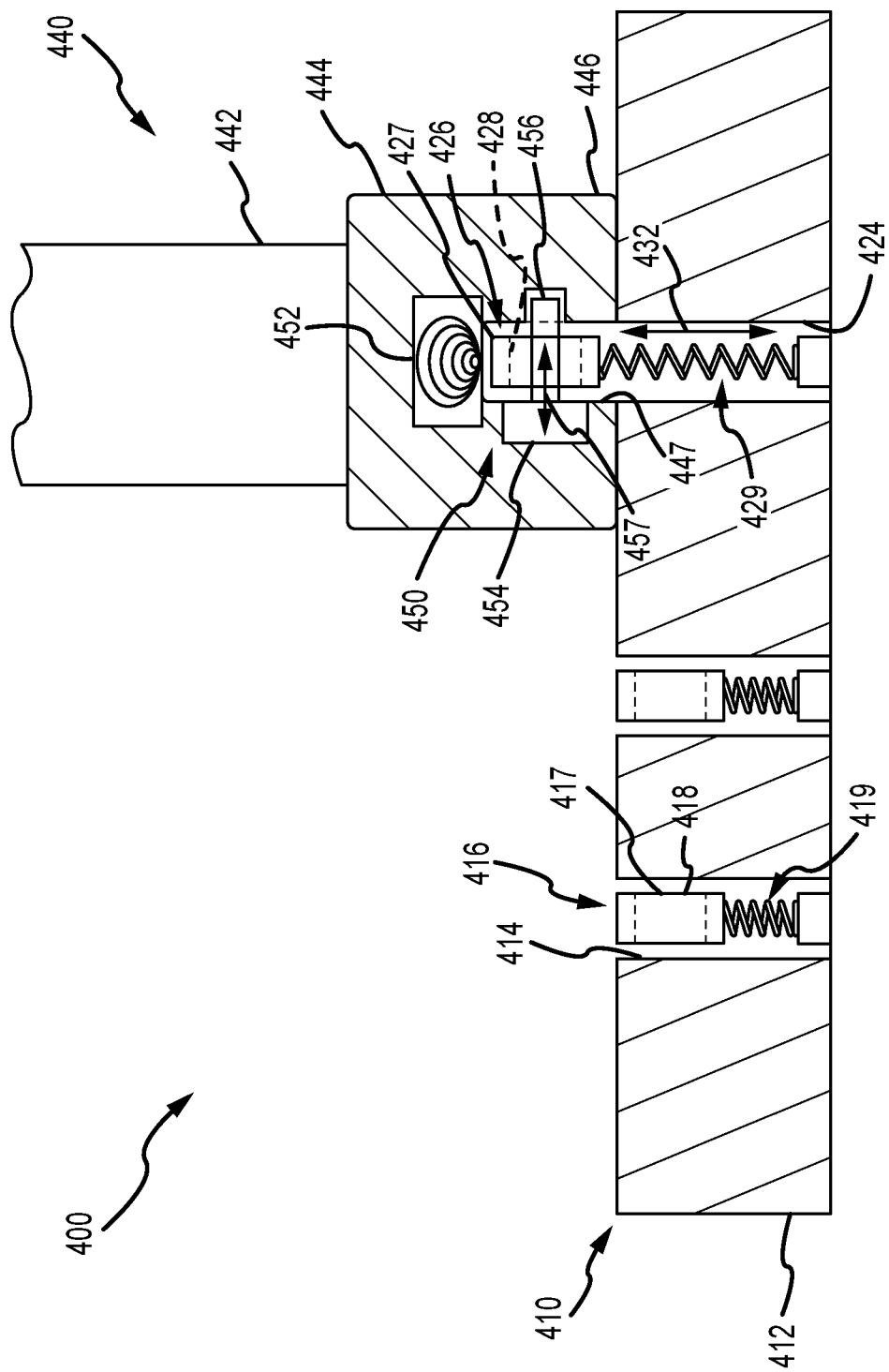
FIG. 4 illustrates a side sectional view of another robot system for utilizing non-conventional physics to achieve robust balancing of a bipedal robot.

FIG. 4 illustrates a side sectional view of another robot system 400 for utilizing non-conventional physics to achieve robust balancing of a bipedal robot 440. In system 400, an array of pins are provided in a floor or stage system 410, and each pin can be raised up out of the upper surface of the floor system 410 and be latched into or coupled to the robot 440 on bottom of the robot's feet. For example, electromagnets on or in the robot 440 (or off the robot 440) may be selectively operated to raise the pin and an actuator or motor in the foot may actuate mechanical fasteners (another pin or lever can be moved in foot) to engage the raised pin (latch onto the pin) so as to fasten or couple the robot 440 to the floor system 410.

FIG. 4 shows that the floor system 410 includes a support surface 412 with a plurality of spaced apart holes or recessed surfaces 414, 424 in which retractable pin assemblies 416, 426 are positioned. Assembly 416 is shown in a retracted or hidden state with a pin or latch 417 held by a spring 419 within the hole/recessed surface 414, and the pin or latch 417 includes a hole or opening 418 for receiving a pin or latching member from a robot. In this regard, the robot 440 is shown to include a leg 442 (with two or more typically included on robot as shown in FIGS. 3A-3C) ending at a lower end/ankle with a foot 444.

The foot 444 includes a recess or slot 447 on a lower surface 446, and, as shown, the lower surface 446 is contacting an upper surface of the floor/support surface 412 so as to position the slot/recess 447 over the retractable pin assembly 426 (i.e., aligned with recess or hole 424 in the floor system 410). A typical floor system 410 may include numerous retractable pin assemblies such that a robot 440 may nearly always have a foot over one of them or at least when they are moved to provide a particular motion or "stunt" where it is desirable to be clamped or anchored to the floor system 410 such as superhuman leaning or the like.

The foot 444 further includes an electromagnet 452 that is operated in response to control signals from a balance controller (not shown but understood from FIG. 1) to generate a magnetic field that causes the ferrous pin 427 to move upward out of the hole 424 as shown with arrow 432 into the recess/groove 447 in the foot bottom surface 446. The foot 444 also includes an actuator or electric motor 454 that is operated in response to control signals from the balance controller to extend, as shown with arrows 457, a latch member or pin 456 into the recess/groove 447 through the hole 428 in the pin 427 (and, in some cases as shown, into an additional recess or shelf in the foot's body for structural support) to latch or anchor the foot 444 to the floor or support surface 412. The robot 440 may then be operated in a desired manner with robust balance and less concern of loss of balance or of slipping on floor or support surface 412 (e.g., to have extreme leaning in one or more directions). When this robot functioning or stunt is completed, the actuator or motor 454 may be operated to retract the latch member 456, and the electromagnetic 452 may be operated to remove or reduce the electromagnetic field to allow the spring member 429 to retract 432 the pin 427 back into the hole 424 in the floor/support surface 412. The robot 440 may then move its foot 444 freely to another spot for selective anchoring.

Figure 5A:
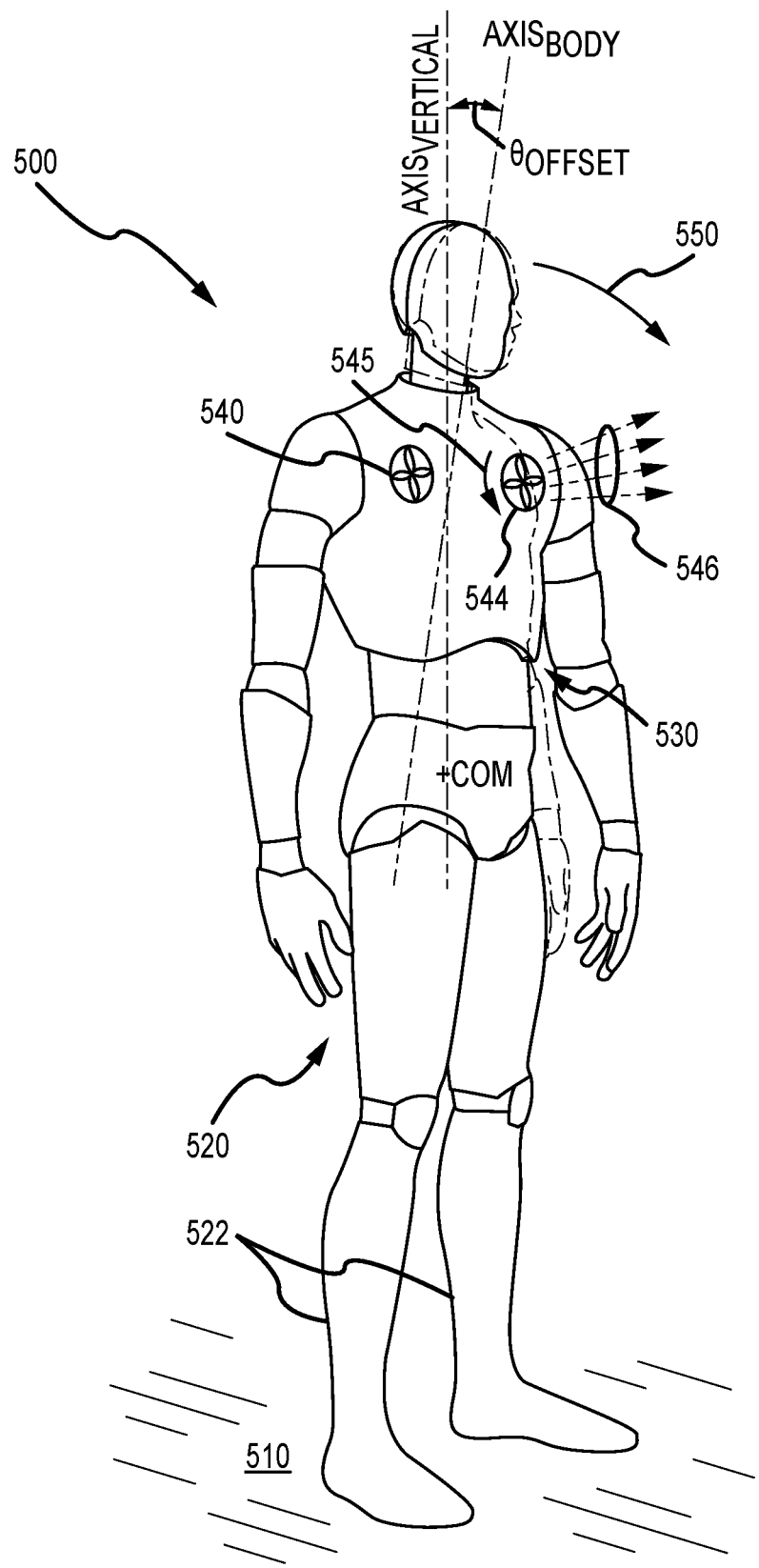
FIGS. 5A and 5B illustrate use of non-conventional GRFs in the form of pairs of fore and aft fans provided in a bipedal robot's torso.
Figure 5B:
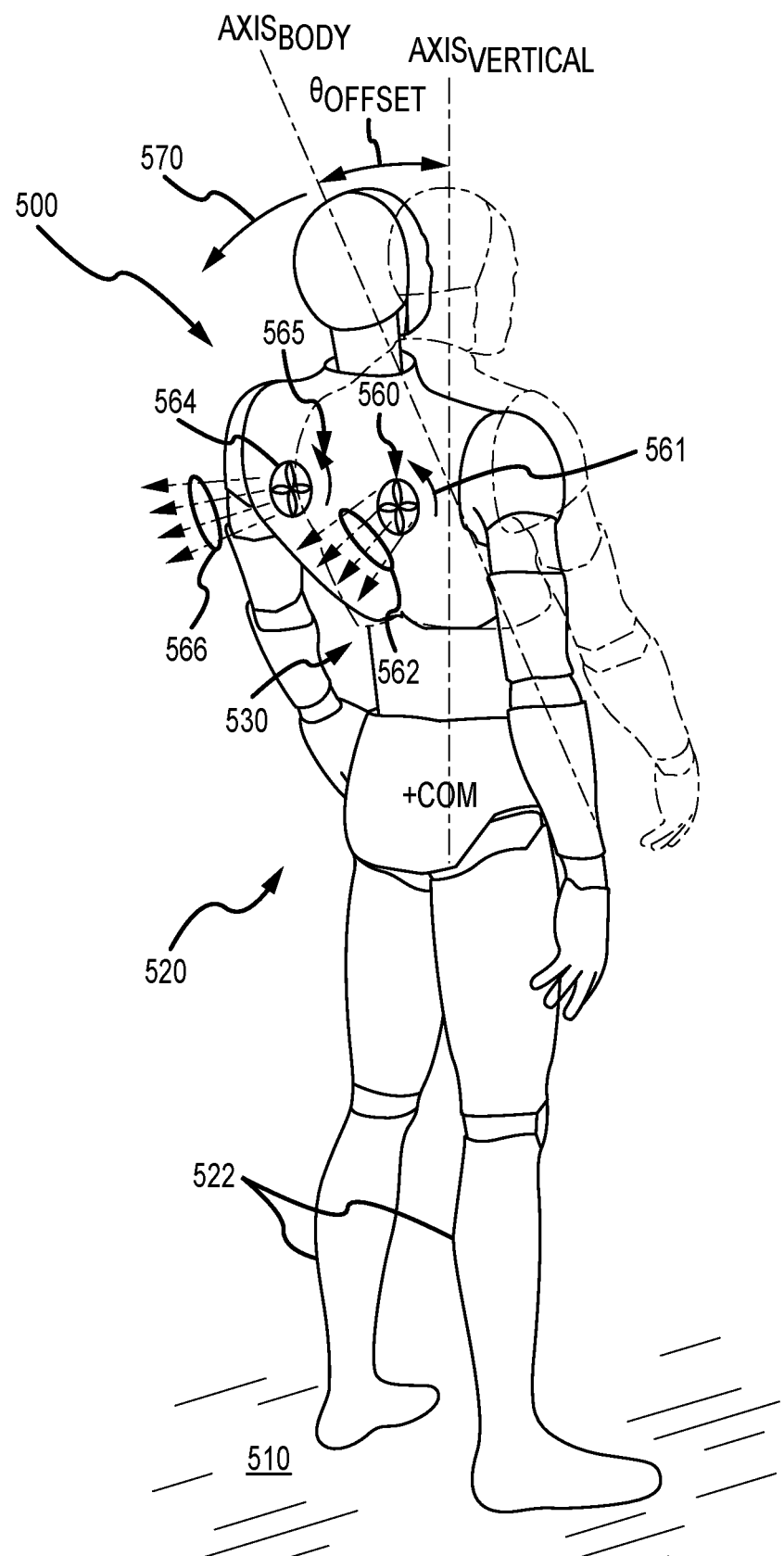

FIGS. 5A and 5B illustrate two operational states of a robot system 500 in which actuators are provided on a bipedal robot 520 to provide corrective or balancing forces by outputting from the robot 520 streams or jets of air. The robot 520 is shown to include a pair of legs 522 operable to provide bipedal locomotion over the ground 510. As discussed with reference to FIG. 1, a balance controller may be included in the robot 520 to sense whether balance is being retained such as by using an accelerometer or the like to sense forward or rearward or side-to-side to movement relative to a vertical, $Axis_{Vertical}$. The balance controller may then selectively operate with control signals one, two, or more actuators to apply forces upon the robot 520 to attempt to counter these sensed movements that may result in a loss of balance without correction. In this regard, the torso 530 of the robot 520 is shown to include a pair of fore actuators 540, 544 in the form of electric fans and a pair of aft actuators 560, 564 also in the form of electric fans.

For example, each fan may be an electric ducted fan (EDF), with one embodiment sizing these to provide a 50 to 80 N/kg actuator. Testing showed that an EDF weighting 100 grams can correct a few degrees on a relatively lightweight robot with a highly responsive thrust profile. One tested robot includes 75 gram ducted fans providing 9 N maximum thrust to achieve balance (with a 22.2V LiPo battery as the power source along with a Teensy microcontroller as the balance controller and a Vector Nav 9-axis IMU as part of the balance sensor assembly). The balance controller tested was able to utilize these four actuators independently and in combination to correct angular movement in any direction from vertical, $Axis_{Vertical}$, and the shown locations (e.g., upper torso above the COM of the robot 520 with left fore and aft fans centrally aligned and right fore and aft fans centrally aligned) are only meant to be one exemplary location, and the number as well as the location and size of each fan may be varied to implement the robot system 500 (e.g., fans may be provided with outlets in the robot's head, arms, and/or legs rather than or in addition to the torso). Additionally, the fan-based actuators shown may be replaced or supplemented by actuators releasing jets of compressed gas such as by providing one or more compressed air (or other gas) canisters within the robot 520 (such as within its torso 530 or within a leg 522), with the balance controller operating a release valve to selectively output jets of air as with the fans to apply corrective or balancing forces (rocket forces) on the robot 520 (e.g., in a direction opposite present unbalancing movement sensed by the onboard or offboard sensors (e.g., part of balance sensor assembly 140 shown in FIG. 1)).

FIG. 5A shows a use case or operational mode for the robot system 500 in which the robot 520 is walking on the ground 510 with an amount of forward movement or tipping shown by arrow 550 (towards the left some amount rather than centered in which case the fan 540 may be concurrently operated with fan 544), which results in the body's axis, $Axis_{Body}$, being offset by an angle, ° Offset, from vertical, $Axis_{Vertical}$. This may balance issue is corrected by the balance controller operating the left fore actuator (or fan) 544 to output a stream of air 546 that causes a balancing force to be applied upon the torso 530 substantially along the center axis of the fan 544 in a direction opposite the output air 546. This force may be used wholly to correct the balance or be used as an additive force along with conventional GRF-based devices provided in the robot 520, and the fan 544 may be run to provide the output stream 546 until the balance controller determines based on processing sensor output that balance has been restored (e.g., the body axis, $Axis_{Body}$, is aligned with vertical, $Axis_{Vertical}$, or within a predefined "balance range" relative to vertical, $Axis_{Vertical}$).

FIG. 5B shows another use case or operational mode for the robot system 500 in which the robot 520 is walking on the ground 510 with an amount of rearward movement or tipping shown by arrow 570 (centrally backward, in this case). This results in the body's axis, $Axis_{Body}$, being offset by an offset angle, ° offset, from vertical, $Axis_{Vertical}$. Correction is provided by the balance controller operating the left and right aft actuators (or fans) 560, 564 in a concurrent (and typically like) manner to output streams of air 562, 566 that together cause balancing forces to be applied upon the torso 530 substantially along the center axes of the fans 560, 564 in a direction opposite the direction of the output airstreams 562, 566. Again, these forces may be used in isolation to correct balance but, more typically, are used in addition to some GRF-based mechanisms in the robot 520, and the fans 560, 564 typically are both run until balance is restored (as discussed above).

Figure 6:
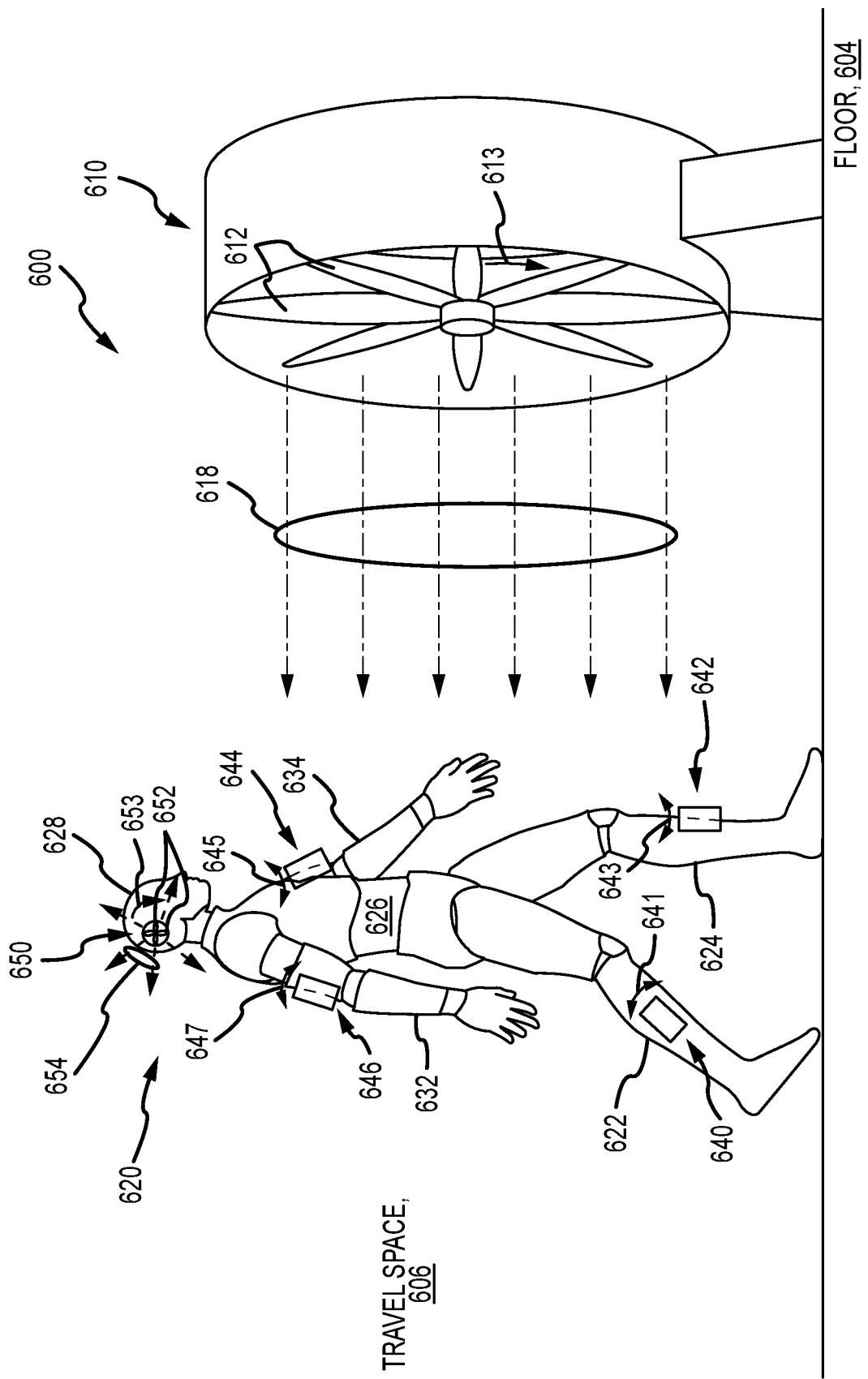
FIG. 6 illustrates another exemplary robot system for robust bipedal locomotion using non-conventional GRFs including blowing air or man-made wind combined with positionable flaps on the robot body.

Numerous other examples can be provided of actuators (onboard and/or offboard the robot) that can be utilized in a robot system to selectively provide non-conventional corrective forces (non-GRFs) to assist a bipedal robot as it moves through a space. FIG. 6 illustrates an exemplary robot system 600 for robust bipedal locomotion using non-conventional correction forces including blowing air or man-made wind combined with positionable flaps on a robot's body. The system 600 includes a floor/support surface 604 upon which one or more fans 610 are provided (but the fans could be hung or wall-mounted in some case). During system operations, the fan 610 is operated to have its blades (or other internal components) 612 rotate 613 to provide a relatively strong (e.g., a 5 to 50 mph) stream of moving air or a man-made wind 618 in the travel space 606 above the floor 604. The fan 610 is shown to provide a directly head-on wind or airstream 618 for a robot 620, but it may be positioned to provide a tailwind and/or angled or side winds/airstreams to apply corrective forces on the robot 620.

The robot 620 is shown to be a bipedal-type robot with a pair of legs 622, 624 coupled to a torso 626 along with a pair of arms 632, 634 and a head 628. The robot 620 may be configured for bipedal locomotion (standing, walking, running, and jumping) as is well-known in the robotics industry, and the specific actuators and body component configurations for achieving such locomotion are not discussed in detail herein but are known to those in the related arts. The robot 620 may be configured to position its body parts such as its torso 626, legs 622, 624, and/or arms 632, 634 in the airstream 618 to receive balancing forces to assist its conventional GRF-based mechanisms to achieve a more robust bipedal locomotion. In some cases, though, additional components such an onboard fan(s) 650 may be provided in the system 600 such as on/in the head 628 of the robot 620 (or on the torso as discussed earlier) that can be selectively operated by a balance controller to rotate its blades 652 as shown with arrows 653 to output an additional stream of air 654 to apply a corrective force in an opposite direction as the stream 654 upon the robot's body along the central axis of the fan 650 (e.g., to push the head 628 toward the right or left with a pair of fans 650 located on opposite sides of the head 628 in the illustrated system 600).

Further, though, a robot 620 operating in a travel space 606 with one or more fans 610 providing blowing air or wind 618 may include one, two, or more aerodynamic flaps or features that are positionable over time to apply one, two, or more corrective or changeable flowing air-based corrective forces at different locations of the robot's body during its locomotion through the travel space 606. To this end, the robot 620 is shown to include four such flaps in the form of flat plates (e.g., rectangular, circular, triangular, or other shapes with rectangular shown as one useful example) that can be positioned to be flush with the surrounding exterior surfaces of the robot body and then selectively moved or pivoted along one edge by actuators in response to control signals from the balance controller to change the aerodynamics of the robot 620 in the stream 618.

In this example, the robot 620 includes a first aerodynamic flap 640 on an outer side of its right leg 622, a second aerodynamic flap 642 on an outer side of its left leg 624, a third aerodynamic flap 646 on its right arm 632, and a fourth aerodynamic flap 644 on its left arm 634. Each of these may be operated (e.g., pivotally positioned about one edge coupled to the robot body) as shown with arrows 641, 643, 645, and 647 to be flush with the nearby exterior surfaces or to angularly extend outward some distance from the robot's exterior surface to be struck by more of the wind/airstream 618 and apply corrective forces of varying magnitude (more as the flaps are extended further out or rotated to a greater angle from 0 degrees up to 90 degrees) by corresponding actuators. In some cases, a square foot of flap surface area can provide up to a 25 N corrective forces on the robot (e.g., along the connected edge or via the flap coupling) with an airstream/wind of 15 m/s.

The balance controller, in response to detecting a loss of balance or leaning in a particular direction relative to vertical, may concurrently operate actuators to change the position of two or more of the flaps (such as both of the leg flaps 640, 642, both of the arm flaps 644, 646, one arm flap 644 and one leg flap 640, or other combinations) to apply two or more corrective forces concurrently on the robot's body to assist in retaining balance by apply form wind/based force on the robot 620 in a direction opposite the present leaning/movement away from vertical. Alternatively, one of the actuators associated with one of the flaps 640, 642, 644, or 646 may be operated to modify one of their angular positions, with each flap actuator being independently operable in the robot system 600.

Figure 7:
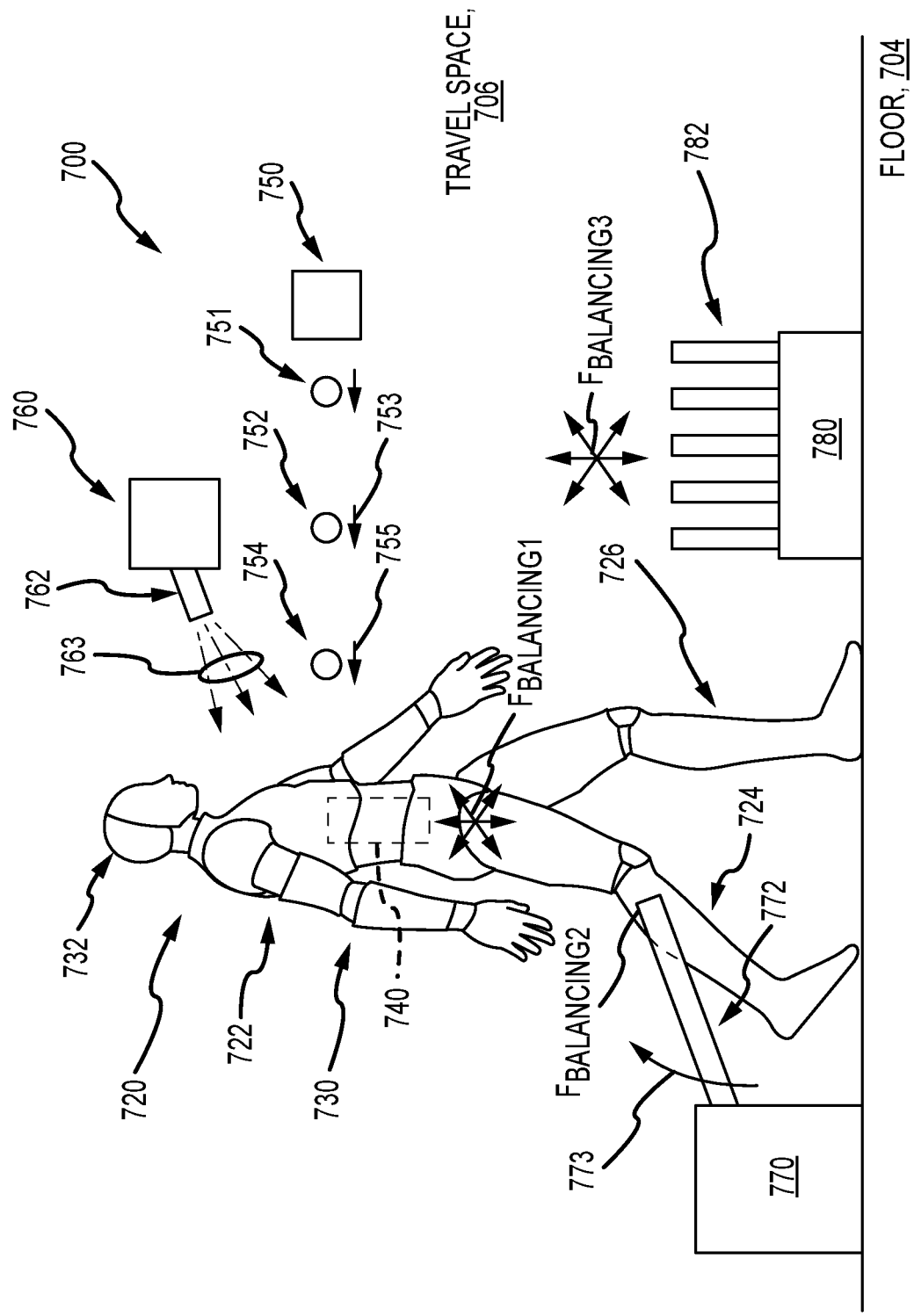
FIG. 7 is a simplified side view of an another robot system of the present description making use of non-GRF to correct balance of a bipedal robot.

FIG. 7 illustrates another exemplary robot system 700 configured to correct balance or provide balance assist to a bipedal robot 720 as it moves over the surface of a floor 704 in a travel space 706. In system 700, the bipedal robot 720 includes a torso 722, right and legs 724, 726, right and left arms 728, 730, and a head 732, and the robot 720 is configured with an assembly of GRF-based components to provide bipedal locomotion through the travel space 706 in a conventional manner. The robot system 700, though, is also adapted to use non-GRFs to correct balance during this locomotion.

In this regard, a balance controller may selectively operate one or more inertial reaction wheels 740 located on or in the robot's torso 722 to apply a balancing force, $F_{Balancing1}$, on the robot 720 to correct an undesired tipping or movement during bipedal locomotion or standing on floor 704. The inertial reaction wheel 740 may take the form of flywheel weights, a spinning disc, and/or a control movement gyroscope. The use of these inertial devices may be supplemented further by selected movement of limbs and/or appendages of the robot 720 including the arms 728 and 730 and/or weights on or in the torso 722 or other portion of the robot body that can be quickly moved to alter the robot's inertia to provide the balancing force, $F_{Balancing1}$. The use of reaction wheels 740 may be desirable to control or resist wobble by providing higher bandwidth on correcting moments and for providing gradual spin-up as corrections accumulate for the robot 720.

Concurrently with or while the reaction wheel 740 is not operating, additional non-GRF devices may operate in system 700 to provide balancing or corrective forces for robot 720 (such as in response to control signals from the balancing controller of the system 700 to address angular movement or tipping that is undesired to retain balance). As shown, the system 700 includes a projectile launcher 750 that ejects or propels out of an outlet or barrel 751 one or more projectiles 752, 754 shown flying with arrows 753, 755 to strike the robot's torso 722 and apply corrective forces that will vary in magnitude based on the mass of the objects 752, 754 and their speed of flight 753, 755. Balls or spherical projectiles 752, 754 are shown, but nearly any shape and size of object may be launched at the robot 720 to apply a corrective force (e.g., one in a direction opposite of a present tipping movement). The projectiles 752, 754 may instead be launched by the launcher 750 to strike other portions of the robot 720 such as the head 732, legs 724, 726, and/or arms 728, 730.

The system 700 further is shown to include a water jet mechanism 760 that selectively produces water streams or projectiles 763 output from its outlet 762 to strike the robot 720 to apply a corrective force such as upon the head 732 or torso 722. The volume of the water stream or projectile 763 along with its velocity are used to control the magnitude and timing of the corrective or balancing force applied by the mechanism 760. In some cases, the mechanism 760 outputs jets of gas such as air to provide the stream 763. Still further, the system 700 includes an actuator 770 for selectively rotating and/or moving 773 an arm or rod 772 within the space 706 so as to strike the robot's body, such as in a leg 724 as shown or another surface of the robot 720, and apply a corrective or balancing force, $F_{Balancing2}$, to assist in retaining or resetting the balance of the robot 720 during its locomotion. Additionally, the system 700 includes another actuation mechanism 780 that selectively moves vertical rods or blades 782 (e.g., tall blades of grass-like elements or other movable pieces of a set in space 706) to apply a contact or balancing forces, $F_{Balancing3}$, in one or more directions upon the robot 720 as it walks or runs through or adjacent the vertical rods/blades 782.

Figure 8:
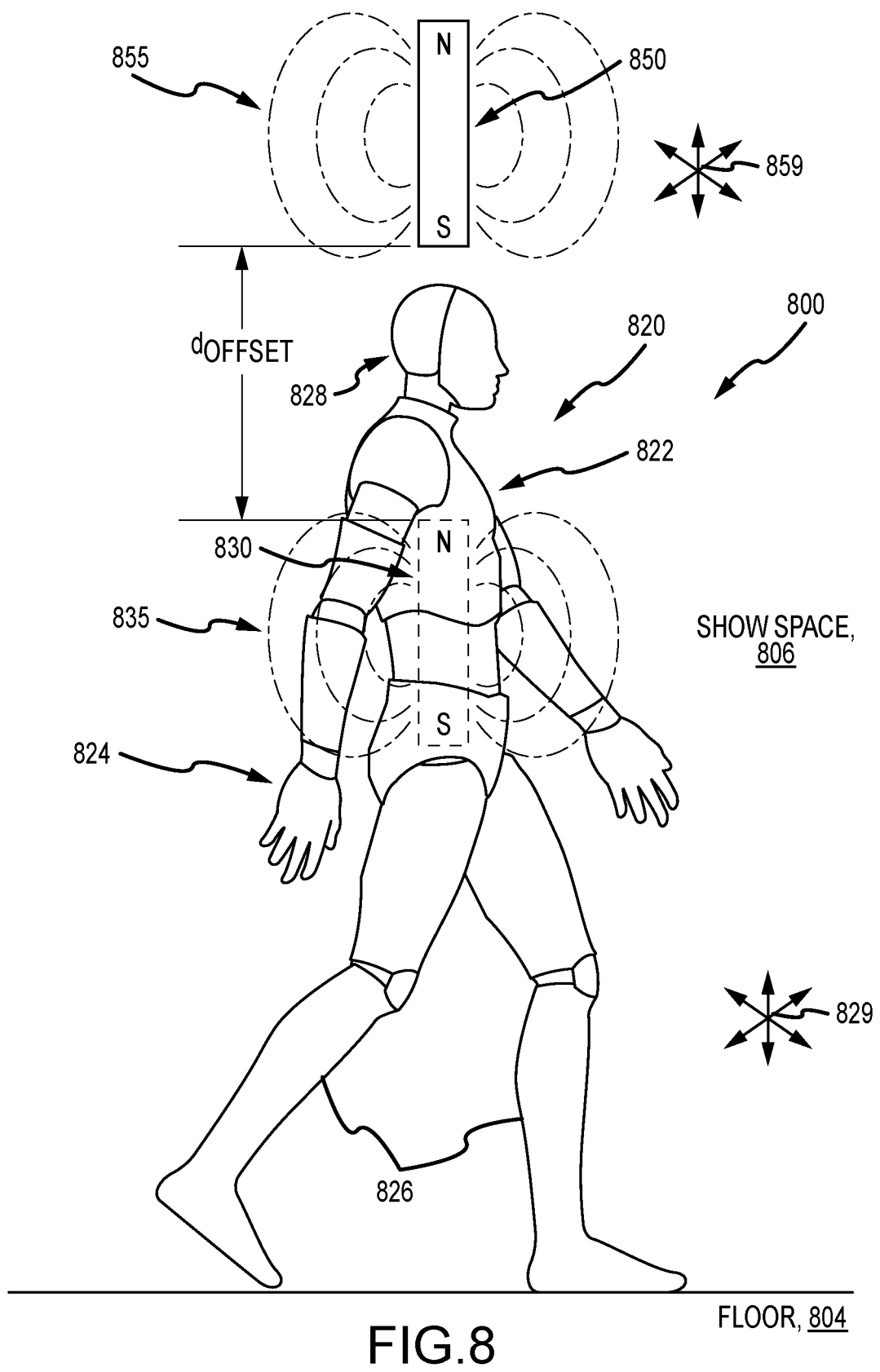
FIG. 8 illustrates a side view of a robot system of the present description utilizing magnetic field lines to provide balancing forces to a bipedal robot.

Another non-conventional correction force that may be used to retain vertical balancing of a robot during its standing and movement is alignment forces between two spaced-apart magnets. In this regard, FIG. 8 illustrates a robot system 800 with a bipedal robot 820 moving in a variety of directions as shown with arrows 829 in a show space 806 upon upper support surfaces of a floor or platform 804. The robot 820 has a torso 822, a pair of arms 824, a pair of legs 826, and a head 828, and these are used to house actuators and components providing GRF-based locomotion as known in the robotics industry for bipedal robots.

To provide non-GRF balancing forces, an elongated magnet 830 is positioned in the robot 720 such as in its torso 822 with the north (or south) end positioned to face upward. Further, the robot system 800 includes a second elongated magnet 850 that is positionable by an actuator (not shown but understood) as shown with arrows 859 to track the movements 829 in the space 806 of the robot 820 to keep the magnet 850 directly above (or below in some other embodiments) the magnet 830 in or on the robot's body (e.g., torso 822). The aligning or second magnet 850 is oriented to be vertical (e.g., have its central axis aligned with vertical and to be parallel to the central axis of magnet 830) and with its poles arranged similar to magnet 830 while being positioned a distance, $d_{Offset}$, from the closest pole of the magnet 830 (e.g., 1 to 3 feet or more).

The poles of the two magnets 830 and 850 are similarly arranged such as with the two north poles up as shown or with the two south poles up (e.g., opposite poles of the magnets 830, 850 being adjacent to each other). The magnets 830, 850 may be permanent magnets in some embodiments. During operations of the system 700, the magnetic field lines 835 and 855 of the two magnets 830 and 850 are used as alignment forces (or a magnetic torque) to retain the vertical pose of the magnet 830 and the torso 822 in which it is rigidly affixed/coupled. By moving 859 the offboard magnet 850 to match movement 829 of the onboard magnet 830 while keeping magnet 850 in a vertical configuration, the magnet 830 also will resist movements from vertical.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, some of the devices used to provide non-conventional GRFs for balancing robots were shown being used in isolation or in a certain combination in a robot or robot system. However, it will readily be understood by those skilled in the robotics arts that these devices may each be used independently or in nearly any combination and not just the ones shown. Further, the fluid shown to be streamed out of or onto the robot body was typically shown to be air, but it may be another gas or a liquid in some cases such as a stream or jets of water.

Still further, the use of one or more aerodynamic flaps may also be used when a robot is moving rapidly through still air or air movement found in a space (e.g., with or without sources of flowing air such as fans in the space). When the velocity of the robot is high enough, an aerodynamic flap(s) can be used efficiently as a control surface just as it would be used when the robot is in an airstream generated from an external fan.

We claim:

1. A robot system for providing balance assistance to robots, comprising:
  a robot with a body positioned in a space;
  a sensor assembly sensing an angular orientation of the body of the robot or movement of the body relative to vertical;
  a balance controller generating control signals when the angular orientation or the movement of the body exceeds a predefined threshold value for retention of balance for the robot in the space; and
  a balance force generation assembly operating in response to the control signals to apply a balancing force upon the body of the robot to modify the angular orientation or resist the movement of the body relative to vertical, wherein the balance force generation assembly comprises at least one electric fan positioned on the body of the robot, and
  wherein the at least one electric fan is operable in response to the control signals from the balance controller to operate to output a stream of air from the body of the robot to apply the balancing force upon the body of the robot.

2. The system of claim 1, wherein the sensor assembly and the balance controller are positioned within the body of the robot.

3. The system of claim 2, wherein the robot is configured for bipedal locomotion through the space using ground reaction force (GRF)-based control and wherein the balancing force is additive to forces generated by the GRF-based control.

4. A robot system for providing balance assistance to robots, comprising:
  a robot with a body positioned in a space;
  a sensor assembly sensing an angular orientation of the body of the robot or movement of the body relative to vertical;
  a balance controller generating control signals when the angular orientation or the movement of the body exceeds a predefined threshold value for retention of balance for the robot in the space; and
  a balance force generation assembly operating in response to the control signals to apply a balancing force upon the body of the robot to modify the angular orientation or resist the movement of the body relative to vertical, wherein the balance force generation assembly comprises a fan in the space, wherein the robot is positioned in an output stream of air from the fan, and wherein the balance force generation assembly comprises at least one aerodynamic flap provided on an exterior surface of the body of the robot that is positionable by an actuator in response to the control signals to apply the balancing force on the body of the robot.

5. A robot system for providing balance assistance to robots, comprising:
a robot with a body positioned in a space;
a sensor assembly sensing an angular orientation of the body of the robot or movement of the body relative to vertical;
a balance controller generating control signals when the angular orientation or the movement of the body exceeds a predefined threshold value for retention of balance for the robot in the space; and
a balance force generation assembly operating in response to the control signals to apply a balancing force upon the body of the robot to modify the angular orientation or resist the movement of the body relative to vertical, wherein the balance force generation assembly comprises an inertial reaction wheel positioned within the body of the robot operating in response to the control signals to generate the balancing force.

6. A robot system for providing balance assistance to robots, comprising:
a robot with a body positioned in a space;
a sensor assembly sensing an angular orientation of the body of the robot or movement of the body relative to vertical;
a balance controller generating control signals when the angular orientation or the movement of the body exceeds a predefined threshold value for retention of balance for the robot in the space; and
a balance force generation assembly operating in response to the control signals to apply a balancing force upon the body of the robot to modify the angular orientation or resist the movement of the body relative to vertical, wherein the balance force generation assembly comprises at least one of a mechanism launching projectiles at the body of the robot in response to the control signals, a mechanism projecting water or air streams onto exterior surfaces of the body of the robot in response to the control signals, and a mechanism rotating or moving physical structural elements or objects in the space to strike an exterior surface of the body of the robot in response to the control signals.

7. A robot system for providing balance assistance to robots, comprising:
a robot with a body positioned in a space; and
a balance force generation assembly operating to apply a balancing force upon the body of the robot to resist tipping or falling of the robot,
wherein the balancing force is a force that replaces or is additive of any ground reaction forces provided for balancing the robot during locomotion of the robot in the space,
wherein the body of the robot comprises a left foot and a right foot,
wherein the space comprises a support surface including an upper layer formed of a ferrous material,
wherein the balance force generation assembly comprises at least one electromagnet in each of the left and right feet, and
wherein a balance controller generates a control signal to independently operate the electromagnet in the left foot when the left foot is contacting the support surface and the electromagnet in the right foot when the right foot is contacting the support surface.

8. The system of claim 7, wherein the robot system includes a sensor assembly including a load sensor proximate to each of the left and right feet sensing loads indicative of the contacting of the left and right feet on the support surface and wherein the balance controller processes output of the load sensors and, in response, generates the control signals for the electromagnets.

9. The system of claim 8, wherein the balance controller halts operation of the electromagnets when the loads are less than a threshold value, whereby clamping of the left and right feet is only provided when the robot is operated to step down upon the support surface.

10. A robot system for providing balance assistance to robots, comprising:
a robot with a body positioned in a space; and
a balance force generation assembly operating to apply a balancing force upon the body of the robot to resist tipping or falling of the robot,
wherein the balancing force is a force that replaces or is additive of any ground reaction forces provided for balancing the robot during locomotion of the robot in the space,
wherein a floor is provided in the space comprising a plurality of retractable anchor elements,
wherein the robot comprises a right foot and a left foot, and
wherein the right and left feet each comprises a coupling mechanism for releasably engaging one of the retractable anchor elements when positioned on the floor over the one of the retractable anchor elements, whereby the right and left feet are selectively anchored to the floor.

11. The system of claim 10, wherein each of the retractable anchor elements comprises a ferrous pin and wherein the coupling mechanisms each comprises a recessed surface for receiving the ferrous pin, a magnet for applying an attractive magnetic force upon the ferrous pin to draw the ferrous pin up from the floor into the recessed surface, and a coupling member positionable in the recessed surface to selectively couple with the ferrous pin.

12. A robot system for providing balance assistance to robots, comprising:
a robot with a body positioned in a space; and
a balance force generation assembly operating to apply a balancing force upon the body of the robot to resist tipping or falling of the robot,
wherein the balancing force is a force that replaces or is additive of any ground reaction forces provided for balancing the robot during locomotion of the robot in the space,
wherein the balance force generation assembly includes a first elongated permanent magnet oriented vertically in or on the body of the robot with a first pole at an upper end and an opposite second pole at a lower end,
wherein the balance force generation assembly further includes a second elongated permanent magnet provided in the space at an offset distance from the body of the robot,
wherein the second elongated permanent magnet is magnetically oriented similar to the first elongated permanent magnet vertically with a first pole at an upper end and an opposite second pole at a lower end proximate to the body of the robot, and
wherein magnetic fields of the first and second elongated permanent magnets interact to provide the balancing force to retain alignment of the first and second elongated permanent magnets.

13. The system of claim 12, wherein the robot is configured for bipedal motion on a support surface in the space and wherein the second elongated permanent magnet is positioned in the space to track movements of the robot in the space to retain a vertical relationship between the first and second elongated permanent magnets.

14. A system for retaining balance of a bipedal robot, comprising:
- a robot configured for bipedal locomotion in a travel space with balancing provided with components providing ground reaction force (GRF)-based control; and
- a non-conventional physics force generation assembly in the travel space operating at least periodically during the bipedal locomotion of the robot to apply a balancing force upon the robot to improve the balancing of the robot achieved solely with the GRF-based control,
- wherein the travel space includes a floor that the robot walks and stands on during the bipedal locomotion, and
- wherein the non-conventional physics force generation assembly comprises means for clamping each foot of the robot to the floor when the foot contacts an upper surface of the floor.

15. The system of claim 14, wherein the clamping of the foot of the robot is achieved by operation of an electromagnet in the foot when the foot is sensed to be contacting the upper surface and wherein the upper surface of the floor comprises a layer of ferrous material.

16. The system of claim 14, further comprising a sensor assembly sensing when the robot is unbalanced and a controller operating in response to operate an actuator of the non-conventional physics force generation assembly to generate the balancing force.

17. The system of claim 16, wherein the actuator comprises at least one of an electric fan onboard the robot, a pivotal aerodynamic flap on an exterior surface of the robot combined with a fan generating a head wind in the travel space, a mechanism operating to move a balancing member in the travel space to strike an exterior surface of the robot, a mechanism adapted for launching projectiles through the travel space to strike an exterior surface of the robot, and a mechanism operable output a stream of air or water to strike an exterior surface of the robot.

18. The system of claim 14, wherein the non-conventional physics force generation assembly includes a first elongated permanent magnet oriented vertically in or on the robot with a first pole at an upper end and an opposite second pole at a lower end and wherein the balance force generation assembly further includes a second elongated permanent magnet provided in the space at an offset distance from the robot, wherein the second elongated permanent magnet is magnetically oriented similar to the first elongated permanent magnet vertically with a first pole at an upper end and an opposite second pole at a lower end proximate to the robot, and wherein magnetic fields of the first and second elongated permanent magnets interact to provide the balancing force to retain alignment of the first and second elongated permanent magnets.

\* \* \* \* \*